United States Patent [19]

Klein et al.

[11] Patent Number: 5,288,564
[45] Date of Patent: Feb. 22, 1994

[54] COMPACT, CYLINDRICAL, MULTI-CELL SEAWATER BATTERY

[75] Inventors: Lloyd E. Klein; Donald V. Conte, both of Fort Wayne, Ind.

[73] Assignee: Magnavox Electronic Systems Company, Fort Wayne, Ind.

[21] Appl. No.: 953,360

[22] Filed: Sep. 30, 1992

[51] Int. Cl.⁵ .................. H01M 6/10; H01M 6/34
[52] U.S. Cl. ..................... 429/94; 429/119
[58] Field of Search .......... 429/94, 119, 149, 158, 429/160

[56]     References Cited
     U.S. PATENT DOCUMENTS

| 3,563,804 | 2/1971 | Garcin et al. | 429/119 |
| 4,005,246 | 1/1977 | Schiffer et al. | 429/94 |
| 4,051,304 | 9/1977 | Snook | 429/94 |
| 4,278,743 | 7/1981 | Thompson | 429/119 |
| 4,822,698 | 4/1989 | Jackovitz et al. | 429/119 X |
| 5,094,928 | 3/1992 | Dyer | 429/94 X |

Primary Examiner—Anthony Skapars
Attorney, Agent, or Firm—John H. Crozier; Richard T. Seeger

[57] ABSTRACT

In a preferred embodiment, a battery including a plurality of series connected battery cells rolled into a cylindrical form. Each of the battery cells includes a thin flexible rectangular anode closely spaced apart from a thin flexible cathode. The plurality of series connected battery cells are placed on a flexible carrier sheet which is tightly wound into the cylindrical form.

17 Claims, 4 Drawing Sheets

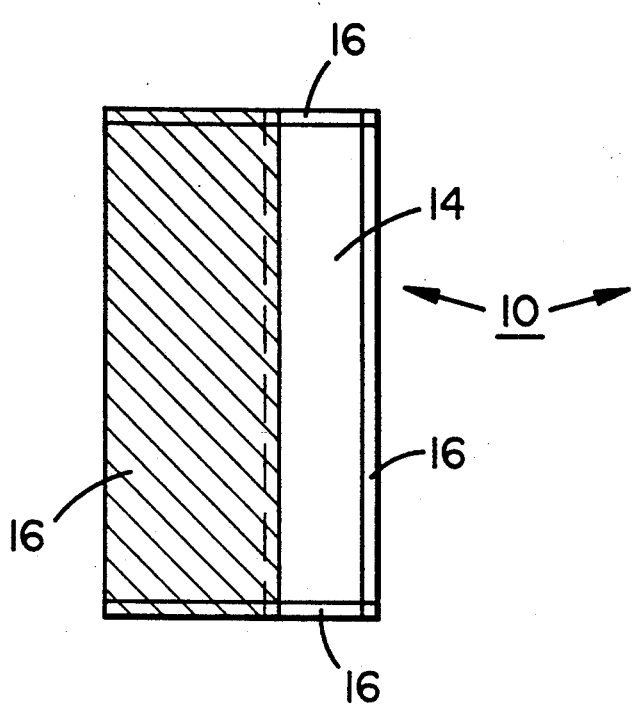
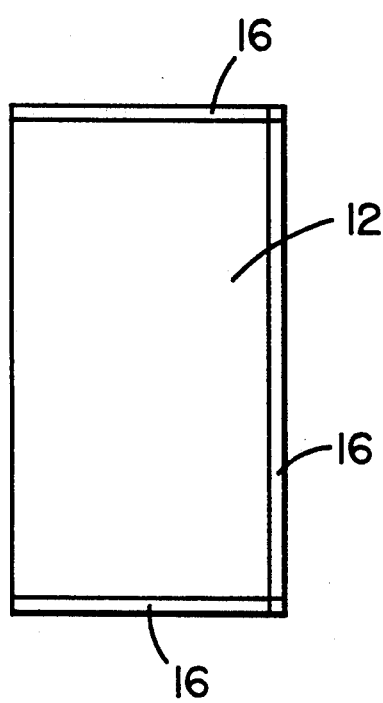
FIG. 1  FIG. 2
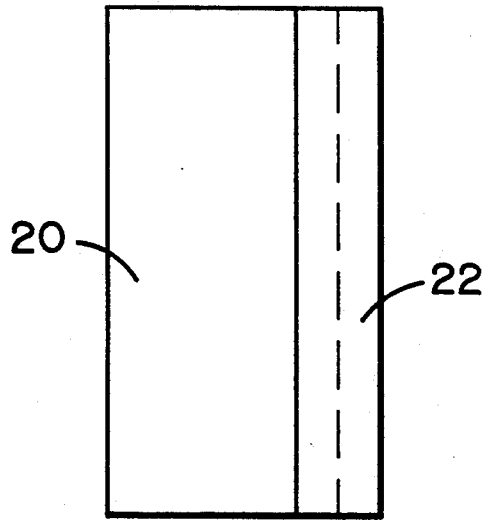
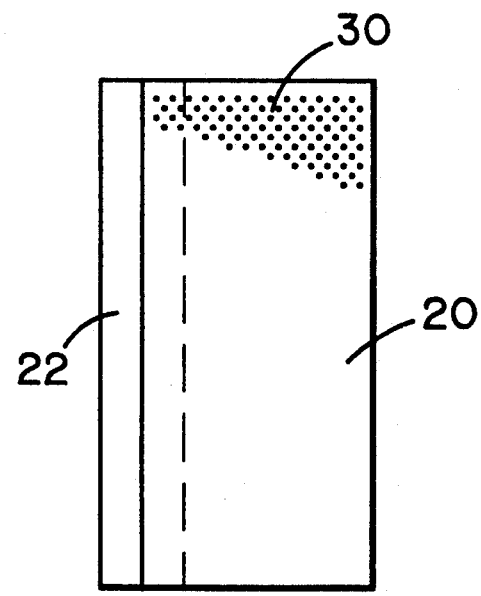
FIG. 3  FIG. 4

COMPACT, CYLINDRICAL, MULTI-CELL SEAWATER BATTERY

BACKGROUND OF THE INVENTION

1. Field of the Invention

The present invention relates to batteries generally and, more particularly, but not by way of limitation, to a novel battery that is compact, lightweight, has high power per unit volume, and is especially useful as a seawater battery.

2. Background Art

Seawater batteries are that class of batteries that employ, as the electrolyte therein, seawater in which they are deployed. Such batteries find use in a number of underwater applications, for example, in powering sonobuoys.

Conventional seawater batteries are usually rectilinear in shape with rectangular plates and barriers, the planes of the plates and barriers being vertical. This configuration is disadvantageous in that seawater batteries are typically employed in cylindrical containing structures, particularly for military ocean deployed devices, and the rectilinear shape is volumetrically inefficient.

Accordingly, it is a principal object of the present invention to provide a seawater battery that is volumetrically efficient.

A further object of the invention is to provide such a seawater battery that is economically and easily manufactured.

An additional object of the invention is to provide such a battery that efficiently controls shunt currents between cells, increasing the battery's performance capability.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment a battery, comprising: a plurality of series connected battery cells rolled into a cylindrical form. Each of said battery cells comprises a thin flexible rectangular anode closely spaced apart from a thin flexible cathode. Said plurality of series connected battery cells are placed on a flexible carrier sheet which is tightly wound into said cylindrical form.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIGS. 1 and 2 are side elevational views of the back and active surface sides, respectively, of an anode for a seawater battery according to the present invention.

FIGS. 3 and 4 are side elevational views of the back and active surface sides, respectively, of a cathode for a seawater battery according to the present invention.

DETAILED DESCRIPTION OF THE PREFERRED EMBODIMENTS

Figure 5:
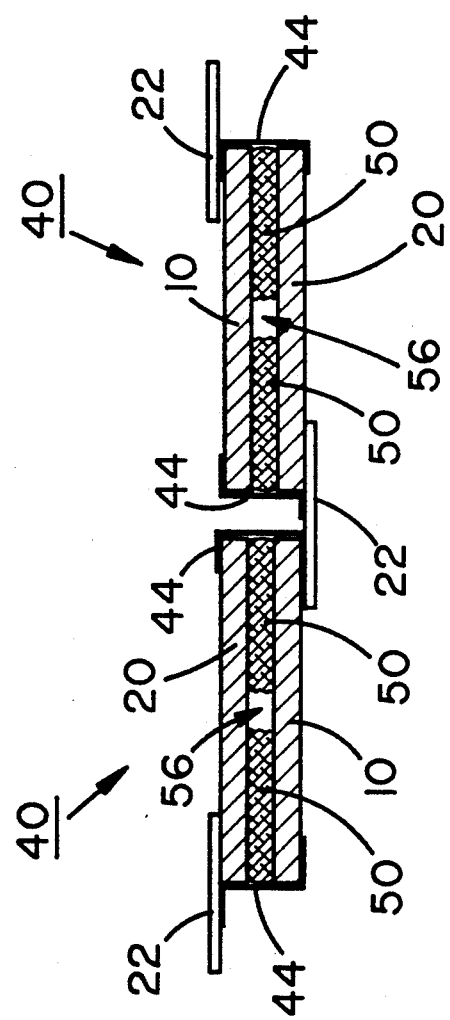
FIG. 5 is a top plan view of the arrangement for joining adjacent cells of a seawater battery constructed according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 and 2 illustrate an anode, generally indicated by the reference numeral 10, for a seawater battery according to the present invention. Anode 10 includes a thin, flexible anode plate 12 normally made from magnesium alloy AZ61 or AZ31 or of other suitable alloys containing zinc or aluminum. A strip of conductive foil 14, preferably of silver or copper, is welded on the back side of anode plate 12 along the edges thereof. Tape 16 is attached to anode 10 over the edges thereof to completely seal foil 14 to anode plate 12 to prevent electrolyte entry between the foil and the anode plate. Tape 16 is preferably polyethylene terephthalate with an acrylic adhesive.

FIGS. 3 and 4 illustrate a cathode 20 which is a thin, flexible plate made from any suitable depolarizer such as silver chloride, lead chloride, copper iodide, copper thiocyanate, or cuprous chloride. Silver chloride is preferable, due to its high density, good flexibility, and high half-cell potential. If cost is a major concern, one of the non-silver varieties of cathodes nay be preferred, so long as the electrode is thin and flexible. Welded to the back side of cathode 20 is a conductive film 22, preferably of silver or copper, which extends outwardly from one edge thereof.

A separator matrix 30 is disposed over the entire surface of cathode 20 to provide separation between the cathode and anode 10 (FIGS. 1 and 2) when a battery cell is assembled. Any suitable type of separator material may be employed, such as glass beads epoxied in place, but it is important that the separator elements be small in diameter and height, so as to not undesirably increase cell thickness or cover excessive areas of active surface area inside the cell. It is also important that the elements of separator matrix 30 be sufficiently closely spaced in the horizontal direction that cathode 20 and anode 10 do not touch during subsequent assembly of a battery. Separator matrix 30 may, instead, be placed on anode 10.

Referring now to FIG. 5, there are illustrated two battery cells, each generally indicated by the reference numeral 40, and each comprising an anode 10 and a cathode 20 placed with their active surfaces facing each other and separated by separator matrix 30 (FIG. 4). Each cell 40 is held together with tape 44 placed along the edges thereof, which tape helps seal the cells to minimize shunt current. Tape 44 is preferably polyethylene terephthalate with an acrylic adhesive. A flexible adhesive 50 is placed along the top and bottom of each cell 40 to minimize intercell shunt current, with openings 56 defined in the adhesive at the top and bottom of each cell to provide for electrolyte flow into the cell structure. Adhesive 50 may be flexible epoxy or putty, but silicon RTV (room temperature vulcanizing) rubber material is preferred. Cells 40 are attached to each other by soldering or welding conductive film 22 extending from cathode 20 of one cell to anode 10 of an adjacent cell. This means of connecting cells 40 in series continues until all cells are connected.

Figure 6:
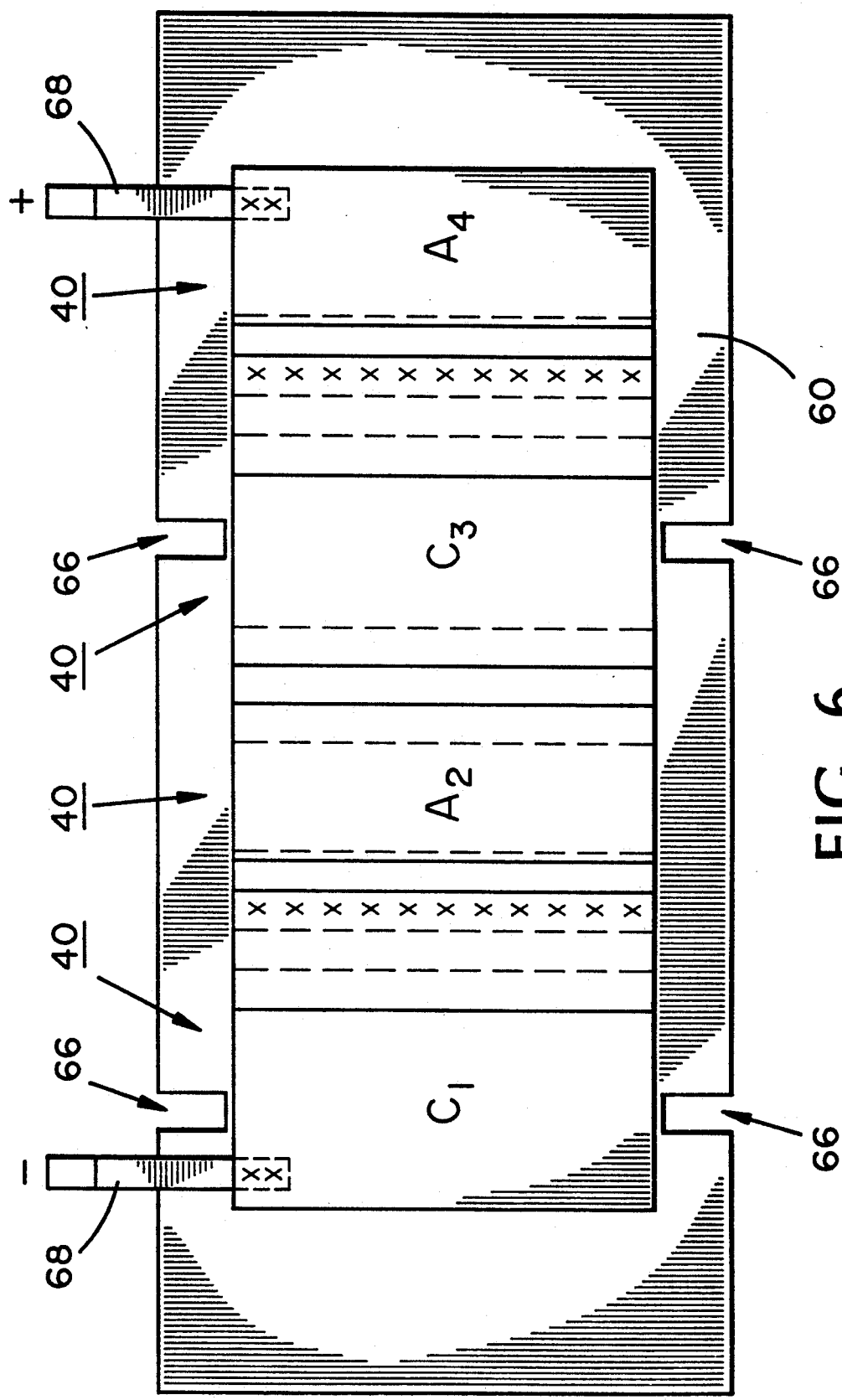
FIG. 6 is a side elevational view of the arrangement of the joined cells of the seawater battery prior to the final manufacturing step.

Referring now to FIG. 6, a string of cells 40, joined as shown on FIG. 5, is centered on a carrier sheet 60 which must be longer and wider than the cell string. Only four cells 40 are shown on FIG. 6: in actuality, there would ordinarily be a much greater number. The material for carrier sheet 60 can be polypropylene, polyethylene, polystyrene, or a similar material; however, 2.5-mil-thick polyethylene terephthalate film has been found to have superior handling characteristics in this application. Notches 66 are burnt, cut, or pierced through carrier 60 above and below alternating cells 40. Notches 66 serve as an electrolyte flow and shunt current control mechanism and must be sufficiently large to permit desired electrolyte flow, but not so large to permit excess shunt current. End cells 40 have attached thereto conductive tabs 68 for positive and negative battery terminals.

Figure 7:
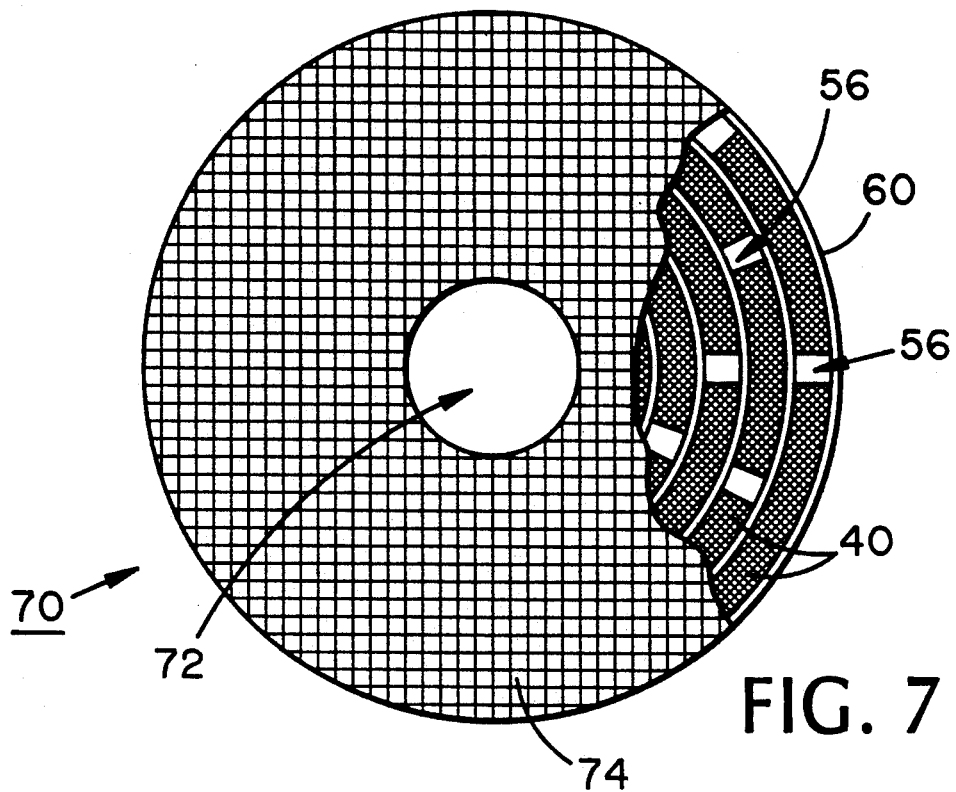
FIG. 7 is a top plan view, partially cut-away, of the seawater battery.
Figure 8:
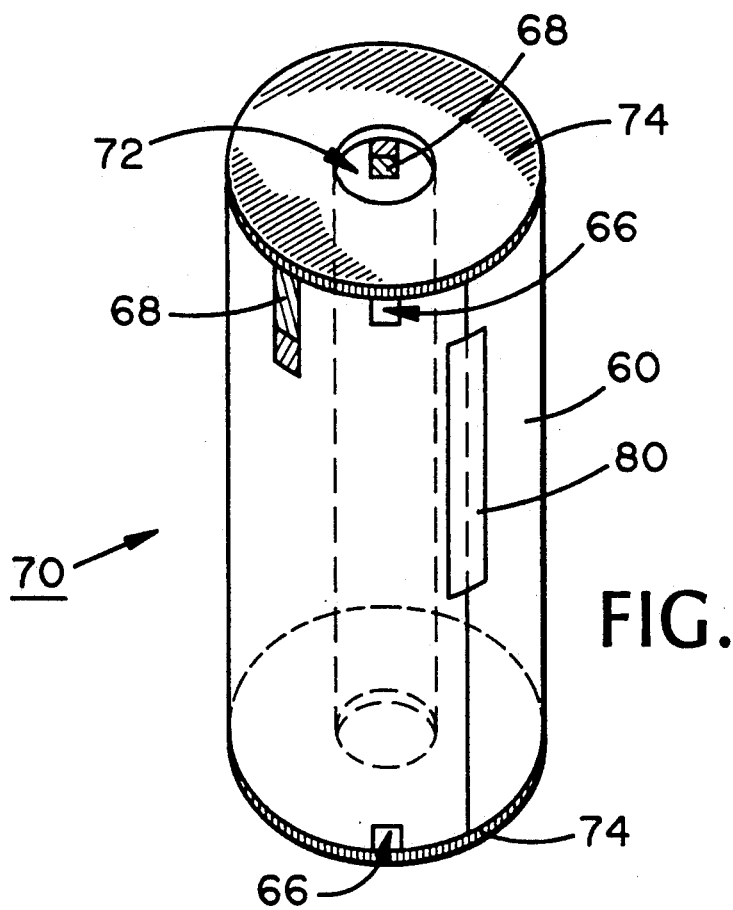
FIG. 8 is a perspective view of the seawater battery showing the form of the assembled battery, with the cells therein omitted from the view.

FIGS. 7 and 8 illustrate a seawater battery, generally indicated by the reference numeral 70, in its final assembled state. It can be seen that carrier 60 has been tightly wound upon itself from one end such that a string of cells 40, joined as shown on FIGS. 5 and 6, is spirally wound into a cylindrical form. A central opening 72 is formed in battery 70, the circumference of which opening must be greater than the width of a cell 40. Battery 70 is sealed on its top and bottom surfaces with a potting compound 74 such as a structural fast-setting epoxy or a low-temperature hot melt adhesive, the potting compound being another mechanism for leakage current control. The thickness of compound 74 must be such that it does not protrude into notches 66. Tape 80 (FIG. 8) secures the rolled carrier 60.

It will thus be seen that the objects set forth above, among those elucidated in,.or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A seawater battery comprising a plurality of series connected battery cells rolled into a cylindrical form, said cells having a top, bottom and side edges, each of said battery cell comprises a thin flexible anode closely spaced apart from a thin flexible cathode; said seawater battery further comprising:
   (a) said anode has attached thereto a conductive foil strip;
   (b) said cathode has a conductive film extending outwardly form one edge thereof; and
   (c) said cells are joined by connecting said conductive film of one cell to said conductive foil strip of an adjacent cell.

2. A seawater battery as defined in claim 1, wherein:
   (a) the side edges of each of said cells are sealed with tape, which tape secures said anode and said cathode in place;
   (b) the top and bottom edges of said cells are sealed with an adhesive; and
   (c) said adhesive at said top and bottom edges has openings defined therein for the passage therethrough of electrolyte.

3. A seawater battery, as defined in claim 1, wherein said plurality of series connected battery cells are placed on a flexible carrier sheet which is tightly wound into said cylindrical form.

4. A seawater battery, as defined in claim 3, further comprising openings defined through said carrier sheet at the top and bottom edges thereof to permit the passage therethrough of electrolyte.

5. A seawater battery, as defined in claim 1, wherein the top and bottom surfaces of said cylindrical form are sealed with a potting compound.

6. A seawater battery, as defined in claim 4, further comprising a cylindrical opening coaxially defined through said cylindrical form to permit electrolyte to pass through said openings defined through said top and bottom edges of said carrier sheet.

7. A seawater battery, comprising:
   (a) a plurality of series connected battery cells;
   (b) each said battery cell comprising a thin, elongate, flexible anode parallely closely spaced apart from a thin, elongate, flexible cathode;
   (c) said plurality of battery cells being rolled into a cylindrical form, such that top-to-bottom free areas within said cylindrical form are substantially limited to the spaces between said anodes and cathodes;
   (d) said anode has attached along a surface thereof a conductive foil strip;
   (e) said cathode has a conductive film attached along an edge thereof and extending outwardly from said edge; and
   (f) said cells are joined by connecting said conductive film of one cell to said conductive foil strip of an adjacent cell.

8. A seawater battery, as defined in claim 7, wherein opposing faces of said anodes and cathodes are held in said spaced apart positions by means of matrixes of particles disposed therebetween.

9. A seawater battery, as defined in claim 7, wherein:
   (a) the side edges of each said cells are sealed with tape, which tape, which tape secures said anode and said cathode in place;
   (b) the top and bottom edges of each of said cells are sealed with an adhesive; and
   (c) said adhesive at said top and bottom edges has openings defined therein for the passage therethrough of electrolyte.

10. A seawater battery, as defined in claim 9, wherein said openings defined in said adhesive are spaced apart approximately the width of a said cell.

11. A seawater battery, as defined in claim 7, wherein said plurality of series connected battery cells are placed on a flexible carrier sheet which it tightly wound into said cylindrical form.

12. A seawater battery, as defined in claim 11, wherein said carrier sheet extends above and below the tops and bottoms, respectively, of said cells.

13. A seawater battery, as defined in claim 12, further comprising openings defined through said carrier sheet at the top and bottom edges thereof to permit the passage therethrough of electrolyte.

14. A seawater battery, as defined in claim 7, wherein the top and bottom surfaces of said cylindrical form are sealed with a potting compound.

15. A seawater battery, as defined in claim 13, further comprising a cylindrical opening coaxially defined through said cylindrical form to permit electrolyte to pass through said openings defined through said top and bottom edges of said carrier sheet.

16. A seawater battery, as defined in claim 13, wherein:

(a) the side edges of each of said cells are sealed with tape, which tape secures said anode and said cathode in place;

(b) the top and bottom edges of each of said cells are sealed with an adhesive;

(c) said adhesive at said top and bottom edges has openings defined therein for the passage therethrough of electrolyte; and (d) flow of electrolyte through said seawater battery is substantially limited to through and between said openings defined in said carrier sheet, said openings defined in said adhesive, and said spaces between opposing faces of said anodes and said cathodes.

17. A seawater battery, as defined in claim 11, wherein one end of said carrier sheet extends beyond an end of said plurality of cells, such that, when said carrier sheet is wound into said cylindrical form, there is sufficient excess length of said carrier sheet to form an outer shell for said cylindrical form.

* * * * *